United States Patent [19]
Willocx et al.

[11] Patent Number: 5,329,588
[45] Date of Patent: Jul. 12, 1994

[54] TELECOMMUNICATION LINE CIRCUIT

[75] Inventors: Eddie L. M. Willocx, Willebroek; Elve D. J. Moons, Lummen, both of Belgium

[73] Assignee: Alcatel N. V., Amsterdam, Netherlands

[21] Appl. No.: 699,998

[22] Filed: May 13, 1991

[30] Foreign Application Priority Data

May 11, 1990 [BE] Belgium .................. 90201195.6

[51] Int. Cl.[5] .......................................... H04M 19/00
[52] U.S. Cl. ................................. 379/413; 379/399; 379/398; 379/400
[58] Field of Search ............. 379/413, 399, 398, 402, 379/403, 404, 338, 340, 413; 307/490, 491, 493

[56] References Cited

U.S. PATENT DOCUMENTS

| 4,472,608 | 9/1984 | Beirne | 379/399 |
|---|---|---|---|
| 4,598,173 | 7/1986 | Chea et al. | 379/413 |
| 4,631,360 | 12/1986 | Johansson et al. | 379/413 |
| 4,803,721 | 2/1989 | Schingh | 379/399 |
| 4,847,818 | 6/1989 | Pieters et al. | 379/252 |
| 4,856,059 | 8/1989 | Halbig | 379/399 |
| 4,872,199 | 10/1989 | Kawami et al. | 379/413 |
| 4,982,422 | 1/1991 | Itoh et al. | 379/413 |
| 5,148,475 | 9/1992 | Warwick et al. | 379/399 |

FOREIGN PATENT DOCUMENTS

| 0078347 | 5/1983 | European Pat. Off. |
|---|---|---|
| 0145039 | 9/1983 | European Pat. Off. |
| 0145038 | 6/1985 | European Pat. Off. |
| 9020057 | 5/1990 | European Pat. Off. |
| 90201196 | 5/1990 | European Pat. Off. |
| 8401249 | 3/1984 | PCT Int'l Appl. |
| 2091973 | 8/1982 | United Kingdom |
| 2199719 | 7/1988 | United Kingdom |

OTHER PUBLICATIONS

Danneels, et al., "Monolithic 70 V Bipolar ... ", *IEEE Journal*, vol. SC-18, No. 3, Jun. 1983, pp. 316-324.
Pieters, et al., "A Monolithic 70-V Subscriber ... ", *IEEE Journal*, vol. SC-21, No. 2, Apr. 1986, pp. 252-258.

*Primary Examiner*—James L. Dwyer
*Assistant Examiner*—M. Shehata
*Attorney, Agent, or Firm*—Robbins, Berliner & Carson

[57] ABSTRACT

Each line wire is separately biassed by DC potentials feeding Inputs of the respective line wire driver amplifiers, the first potential (BA) being nearer ground and the second at an equal distance from the negative supply used to power the amplifiers so as to allow a suitable AC swing for the speech and metering signals also feeding the inputs of the amplifiers. The second potential (BB) is obtained from a DC synthesizing loop voltage and to which is added (OA6) the first potential, both potentials being also combined (OA5) to control a switched mode DC/DC converter delivering the negative power supply. In addition to both potentials being filtered with reference to ground, another measure reducing noise relies on AC signals push-pull outputs driving the amplifier inputs, also in push-pull through four resistances.

15 Claims, 6 Drawing Sheets

TELECOMMUNICATION LINE CIRCUIT

The invention relates to a telecommunication line circuit wherein each line wire is fed by a separate line wire amplifier providing a distinct bias potential for each wire and each powered by a voltage supply obtained from a DC loop resistance synthesizing circuit including the two amplifiers and a battery power supply.

BACKGROUND ART

Such line circuits, particularly those involving a telephone Subscriber Line Interface Circuit (SLIC) and embodied in the form of a monolithic Integrated Circuit or chip, are known for instance from the IEEE Journal of Solid-State Circuits, Vol. SC-18, No 3, June 1983, p. 316 to 324, and Vol. SC-21, No 2, April 1986, p. 252 to 258 as well as from the European patent application published under No 0201635 (J. PIETERS 3). Particularly to allow a low power dissipation in the SLIC, the measures relied upon in these earlier designs include DC and AC line feed impedances using loop synthesis and starting from relatively low resistance, e.g. 50 ohm, physical feed resistors to obtain higher synthesized values as desired by the telephone administrations or operating companies. For the DC feed resistances for instance and for a given DC line current, the power consumption is in direct proportion to the value of the physical resistors. Building effective and adjustable synthesized line feed impedances, both for AC and DC, involves sensing the voltages across the two physical feed resistors using a high ohmic resistor bridge, usually two potentiometers diagonally cross-connected with the low ohmic feed resistors to constitute a 6-resistance 3-port Herter bridge between the line and the exchange and with its sensing port followed by a voltage transducer. The output from the latter is subtracted from the input signals feeding two line driver amplifiers whose outputs are coupled to their respective line wires, each time in series with a protecting resistor e.g. 10 ohm, and the feed resistor originating one of the sensed voltage. In this way, the total synthesized resistance for instance is readily assessed to be equal to twice the sum of the original feed and protecting resistances, e.g. 60 ohm, and of the original feed resistance multiplied by the transducer or total DC loop gain which can be programmed under software control. Additionally, a synthesized battery voltage is also produced in a similar manner so that it is added to the voltage generated by the DC line current due to the total synthesized resistance, to constitute the effective synthesized DC feed voltage between the two line wires.

Additionally, the A-wire should be biassed a few volts below ground potential and the B-wire by a like amount above the negative supply potential to allow for the maximum required AC swing of speech signals. Since metering signals may also appear on the wires, such bias voltages must also take these into account to avoid saturation of the line driver amplifiers during the transmission of such metering signals, either by allowing a margin catering for the maximum amplitude of the metering signals as in the European application published under No 0078347 (J. DANNEELS 7) or preferably by varying the bias in function of the metering signal value as in the Belgian patent No 898051 (L. BIENSTMAN 5) and the 1986 article referred to above. To create the A and B biasses and additionally enable battery reversals with exchange of the biasses, the latter article discloses a circuit with three resistances effectively in series between ground and the negative supply potential with two resistances each developing the same desired metering adjustable bias so that the potentials at the terminals of the intermediate resistance correspond to the desired biasses. Using current mirrors and a differential gating circuit, equivalent biasses can be applied to the A and B or the B and A wires depending on the desired polarity.

Such a circuitry, first producing the A(B)-wire DC bias, second the synthesized feed voltage between the two wires and third, using the difference between the first and the second the B(A)-wire DC bias is relatively complex, not largely exempt from noise, does not guarantee equal bias variations on the A- and B-wires and cannot permit special signalling conditions thereon, e.g. Belgian patent No 903911 (J. PIETERS 5). In the latter, the polarity reversal circuit can apply respective input potentials to the operational amplifiers constituting the A and B line drivers in high and low or low and high fashion, but also low for both drivers to allow ground signalling on each of the two wires. Moreover, it would also be desirable to allow the fourth possible combination for A and B wire biassing, i.e. both at high level as required for certain applications.

DISCLOSURE OF INVENTION

A general object of the invention is to avoid the above restrictions while retaining the desired features of the AC and DC loop synthesis circuits of European application No 0201635 and of the impedance synthesis multiple loop circuitry, using a filtering transducer with separate low pass and high pass frequency response outputs and described in the PCT application first filed on Dec. 24, 1988 (P. GUEBELS 8) under No PCT/EP88/01216 or in our application first filed in Europe concurrently (E. WILLOCX - E. MOONS - P. GUEBELS 6-7-8) with the present one.

In accordance with a first characteristic of the invention, separate voltage biassing means are provided for each of the two line wires and the synthesizing circuit is controlled by a combination of the two line wire biassing potentials.

In this way, the DC bias voltage for the wire biassed nearer to ground can be generated by a grounded circuit with a noise reducing low pass filter and a like grounded circuit can be involved in the generation of the synthesized DC bias voltage. This last voltage can be added to the first so as to produce the DC bias voltage for the other wire biassed nearer to the other (negative) supply potential. A set of four pass gates can then be used to couple the high and low DC bias voltages in any of the four possible combinations to the inputs of the two line drivers, i.e. A-wire high and B-wire low or the reverse, or both low or high.

An efficient way to help produce the desired synthesized DC feed voltage is a switched mode DC/DC converter. Such a circuit using a flyback transformer, connected to a diode and to a capacitance, and a sawtooth oscillator has already been disclosed in the U.S. Pat. No. 4,598,173 (R. CHEA 10) and is included in a DC synthesizing loop for a telephone line circuit. However, the energy storing capacitance of this converter is branched between the A- and B-wires on the side of the feed resistors nearer to the exchange, sensing of the voltage between these wires on the side of the subscriber being used.

Another object of the invention is to incorporate such a switched mode DC/DC converter into the SLICs of the type disclosed in the above identified articles and European patent application No 0201635 where line drivers are used to feed the two line wires and a Herter bridge to sense the voltages produced across the two series feed resistors.

In accordance with another characteristic of the invention, the voltage biassing means for the two line wires have their outputs combined in a transducer associated with a switched mode DC/DC converter fed by the battery power supply and powering the two line wire amplifiers, a DC voltage representative of the DC current through the line wires being coupled to one of the voltage biassing means.

Such a circuit can therefore integrate a flyback converter operating in discontinuous conducting mode, preferably designed in accordance the patent application No 90200575.0 first filed in Europe on Mar. 12, 1990 (E. WILLOCX 5), into the DC loop resistance synthesizing circuit of a SLIC wherein the A- and B-wire are biassed separately, one nearer ground and the other nearer to the negative power supply. Indeed, the transducer can combine the two line wire biassing voltages so as to derive therefrom the synthesized DC bias voltage. A switched mode power supply also dissipates less power than a series voltage regulator and offers the possibility of the synthesized DC voltage having a wider tolerance and a magnitude larger than that of the negative battery, e.g. −48 or −60 volts so that independently from the line length the flow of a sufficient line current, as required by the telephone administration, can always be ensured.

It is to be noted that the PCT application published under No WO84/01249 also discloses a switched mode DC/DC converter to power the two line wire amplifiers and with separate biassing means to place the A-wire nearer ground. But instead of another separate biassing means to place the B-wire nearer negative power supply, both means having their outputs combined in a transducer, the latter is a differential amplifier with its input branched across the line and with its filtered output being added to a reference voltage having a value equal to twice the equal DC bias for the A- and B-wires before reaching the control input of the converter.

BRIEF DESCRIPTION OF DRAWINGS

The above mentioned and other objects and features of the invention will become more apparent and the invention itself will be best understood by referring to the following description of embodiments taken in conjunction with the accompanying drawings which represent.

BEST MODE FOR CARRYING OUT THE INVENTION

Figure 1:
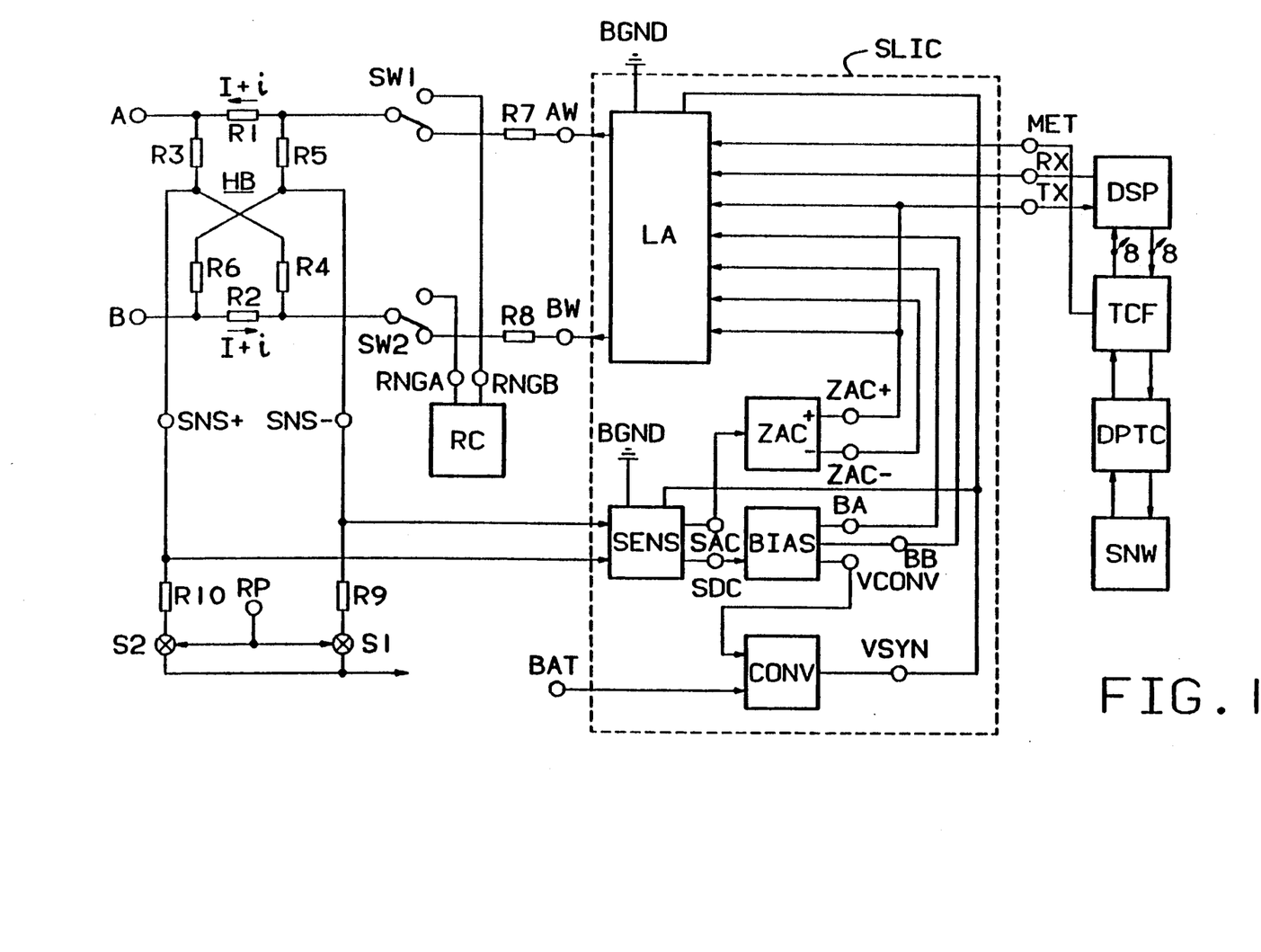
FIG. 1, a telecommunication circuit including a Subscriber Line Interface Circuit (SLIC) according to the invention.

The communication line circuit of FIG. 1 is coupled to a two-wire telephone line (not shown) at terminals A and B. As in the European application No 0201635 for instance, it includes a Herter bridge HB, comprising resistors R1 to R6, change-over relay contacts SW1 and SW2, and a SLIC.

As shown, it is connected to the ringing source RC, supplying a ringing signal on terminals RNGA and RNGB, and, in the same way as for the European application No 0201635, to a Digital Signal Processor DSP, a TransCoder and Filter circuit TCF, a Dual Processor Terminal Controller DPTC and a Switching NetWork SNW. In the DSP, for which reference can be made to Belgian patents 898959 (F. VAN SIMAEYS 2) and 898960 (F. VAN SIMAEYS 1), a digital speech signal received from TCF is converted into an analog speech signal which is then applied to the speech terminals RX (with ground return) of SLIC. Conversely it transforms an analog speech signal transmitted to DSP via the speech transmit terminal TX (also with ground return) of SLIC into a digital version which is applied to TCF. Circuit DSP has also a serial connection (not shown) for reception of status bits from SLIC. The function of the various control and status bits of a SLIC is described in Belgian patent 898049 (L. BIENSTMAN 3). In TCF, a transcoding operation on digital signals received from DSP and DPTC is performed and TCF is also adapted to supply a metering signal MET (with ground return) to SLIC. These operations are described in Belgian patents 897771 (D. RABAEY 1) and 897773 (D. RABAEY 3). In SNW, the digital interconnection of the coded voice signals between different communication line circuits is performed.

Whereas HB, SW1/2, SLIC and DSP are shown here to be individually associated to the telephone line, TCF and DPTC are provided in common for a number of such lines, e.g. 8 lines, as indicated by the multipling arrows. But modifications of this arrangement, such as a DSP also common to several lines, would not affect the features of the invention illustrated below.

The general interconnections between HB, LA and SENS, the latter being the sense amplifier receiving its input from HB at terminals SNS− and SNS+, are similar to those disclosed in European patent application No 0201635, with SENS preferably designed as described in application PCT/EP88/01216 or in our application first filed in Europe concurrently with the present one. Terminals A and B are coupled through series feed resistors R1 and R2 to the movable armatures of change-over switches SW1 and SW2. These switches allow the telephone line to be fed by a ringing signal supplied to terminals RNGA and RNGB from a ringing source RC when SW1-SW2 are displaced from the position shown for which a signal generated across outputs AW and BW of line driver amplifier section LA reaches SW1 and SW2 through protecting resistors R7 and R8 respectively, signals from A and B being also transmissible to AW and BW. Switches SW1 and SW2 are contacts of a relay (not shown) which is controlled by a drive signal (not shown) from DSP. In all conditions of the telephone line, e.g. ringing or not, an output voltage is generated across sense outputs SNS− and SNS+ of HB, proportional to the DC+AC line currents I+i flowing in the telephone line through R1 and R2. This output voltage is free from components due to undesired longitudinal currents flowing in the conductors of this line.

Sense circuit SENS splits the signals across its input terminals into two complementary output frequency bandwidths, on the one hand a voice frequency high pass response on output SAC and on the other hand a lowpass response on output SDC including in particular signals proportional to the DC current I flowing in the conductors of this line, the cut off of these responses being for instance around 30 Hz.

Resistors R9 and R10 of equal value connected between SNS− and SNS+ respectively at one end and through respective pass gates S1 and S2 to negative battery at their other end are associated with SENS, as described in our European patent application first filed concurrently with the present one, this as part of the measures designed to reduce power consumption. Pass gates S1 and S2, controlled at common terminal RP, are only unblocked during the ringing phase and only then will R9 and R10 dissipate energy for the purpose of lowering the potentials at SNS− and SNS+ to avoid excessive ones due to the large amplitudes of the ringing signals.

Apart from battery ground (BGND) and the low supply voltages (source and drain) needed for the operational amplifiers of SENS, the latter is not powered by the negative battery potential applied to R9/10 during ringing but by the synthesized DC voltage produced at the output VSYN of converter CONV and mainly needed to power the line wire driver operational amplifiers part of LA. This extra use of VSYN is advantageous for the input stage of SENS in view of the wide range of the input signals.

Output SAC of SENS is connected to the input of AC transducer ZAC, which produces a signal across its balanced (push-pull) outputs ZAC+ and ZAC−, amplified in line amplifier section LA, and so coupled back to the telephone line via its line wire outputs AW and BW. In this AC impedance synthesis, the transfer function of transducer ZAC is such that the AC impedance seen from the telephone line between terminals A and B is that required by the telephone administration. Output ZAC+ of transducer ZAC is also used as the speech signal transmit terminal TX of the SLIC. The transducer ZAC now uses a double ended (push-pull) output for its operational amplifier, active element of the transducer, and otherwise generally designed, e.g. frequency response, as described in the above mentioned European patent application No 0201635 and 1986 article. This is another measure conducive to low noise operation because, as compared to the previous single ended output of these references, ZAC+ and − double the output swing giving a 6 dB improvement in the operational amplifier noise − limited dynamic range. Further, common mode signals, including supply variations, will then be rejected by the differential inputs of the operational amplifiers part of LA and driving the A- and B-wires and whose gain can be kept lower due to the increased output swing of ZAC+ and −, this being yet another noise reducing factor.

Output SDC of SENS is connected to a circuit BIAS which has three outputs as shown:

Outputs BA/BB on which are generated bias voltages feed back to the line amplifier section LA and causing DC voltages to appear on outputs AW/BW. These voltages fulfil the DC feed requirements for the telephone line, Output VCONV which is connected to converter CONV. The latter converts the battery voltage at its input terminal BAT to a voltage on its output VSYN delivering power to the line amplifier section LA in an efficient manner. The converter CONV may preferably be of the flyback type described in the European patent application No 90200575.0 and with BAT corresponding to a negative battery supply sustaining high peak current loads.

The DC voltage levels appearing at telephone line terminals A and B due to the above mentioned bias voltages of line amplifier section LA are simulating a predetermined feed voltage and resistance by DC resistance synthesis as outlined above and as described in more detail further below.

Figure 2:
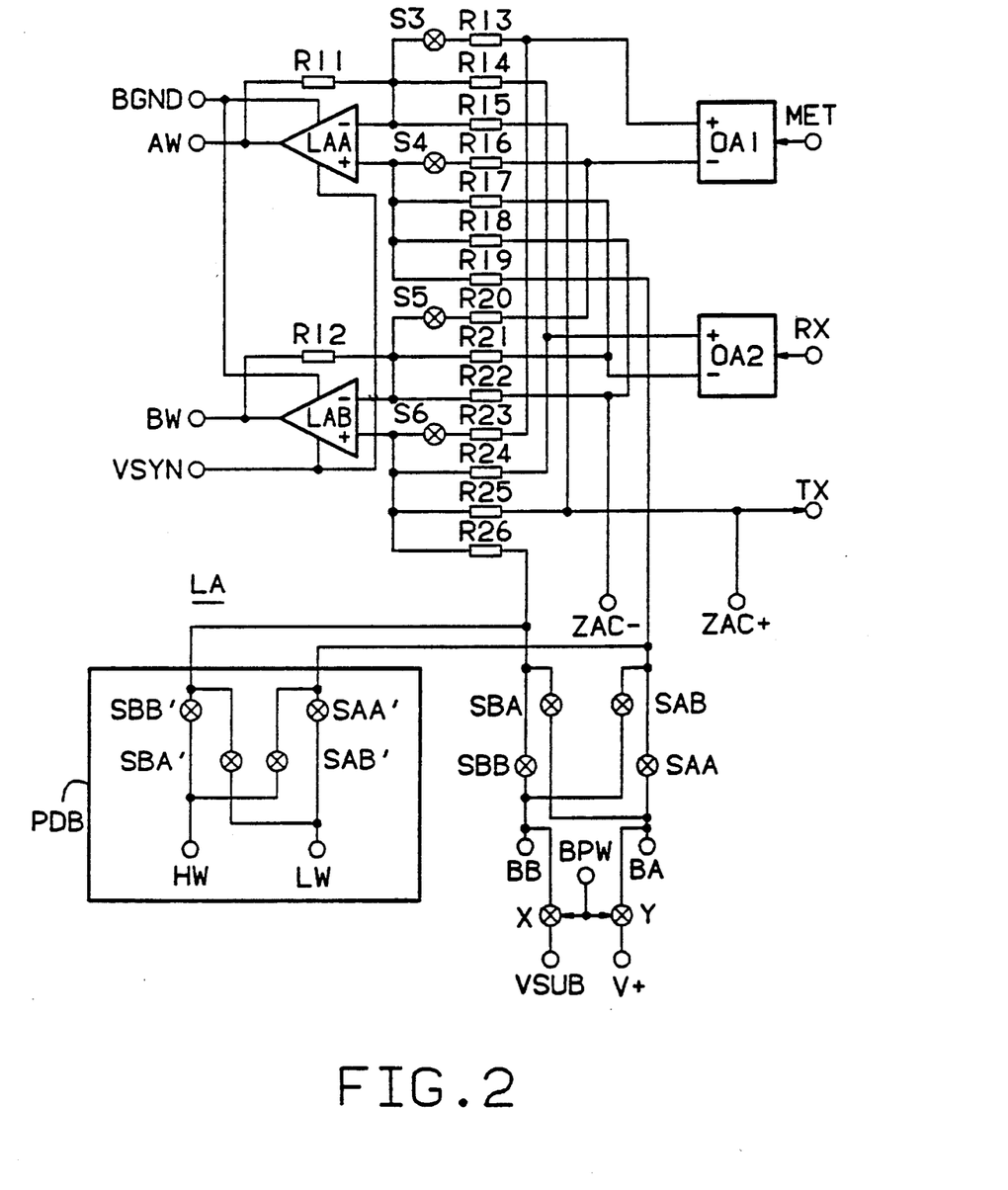
FIG. 2, the line driver amplifier section LA of FIG. 1.

Details of the above line amplifier section LA are given in FIG. 2. The circuit includes two like high voltage line driver operational amplifiers LAA and LAB with inverting and non-inverting inputs, their respective outputs AW and BW constituting the outputs of LA. Both are powered between a ground voltage on the BGND terminal and a regulated DC voltage on terminal VSYN from CONV. The AC signal components across outputs AW and BW are proportional to the sum of three AC signals: firstly a signal across the balanced (push-pull) + and − outputs of operational amplifier OA1 supplied by a received metering signal MET, secondly a signal across the balanced + and − outputs of operational amplifiers OA2 supplied by a received voice signal RX, and thirdly the signal across the balanced push-pull outputs ZAC+ and ZAC− of the transducer ZAC.

The summation of above three AC signals is done by summing networks R13-R14-R15 at the − input of LAA and R16-R17-R18 at the + input of LAA, with negative feedback resistor R11, and in a push-pull manner, e.g. R14 connected to the − input of LAA and R24 to the + input of LAB, to the inputs of LAB for which the summing networks R20-R21-R22 and R23-R24-R26 with negative feedback resistor R12 perform similar functions. The metering signal on the output of OA1 is only active when pass gates S3 to S6 are made conductive, which is only during the metering condition, controlled by the above mentioned circuit DSP. The double-ended outputs of OA1 and OA2 offer the same advantages as those already mentioned above for the balanced outputs of ZAC+ and − part of the AC impedance synthesizing loop feeding the balanced inputs of LAA and LAB through the four resistors R15-R18-R22-R25.

Terminals BA and BB are coupled to the non-inverting inputs of line driver amplifiers LAA and LAB through resistors R19 and R26 and the pass gates SAA, SAB, SBA and SBB connected as shown so that two out of these four gates not connected to the same resistor R19 or R26 can be simultaneously unblocked. These four possibilities such as the unblocking of SAA and SBB are controlled by two binary latches (not shown) set in accordance with the value of two polarity reversal drive bits BR0/1 transmitted by DSP, e.g. Belgian patent No 903910 (J. PIETERS 4), to indicate the four possible combinations of desired high (H) and low (L) DC biasses on AW and BW according to the following table

| BR0 | BR1 | Gates unblocked | | AW | BW |
|---|---|---|---|---|---|
| 0 | 0 | SAA | SBB | H | L |
| 1 | 0 | SAB | SBA | L | H |
| 0 | 1 | SAA | SBA | H | H |
| 1 | 1 | SAB | SBB | L | L |

Thus, in the normal condition H/L fop AW/BW for instance, BA is connected to R19 and BB to R26.

An alternative Power Down Bias circuit PDB is provided for R19 and R26 to reduce current consumption. In Power Down mode none of the gates SAA, SAB, SBA and SBB can be unblocked while a set of similar gates SAA', SAB', SBA' and SBB' included in PDB can then be unblocked in pairs in a similar way to provide low power fixed biassing LW and HW for AW and BW. In order to prevent the pass gates SAA, SAB, SBB, SBA from becoming conductive when the line circuit is in the power down mode the outputs BA and BB are biased to V+ and the substrate voltage VSUB respectively via corresponding pass gates X and Y. These pass gates are controlled by the signal $\overline{BPW}$ which is activated in the power down mode of the circuit.

Figure 3:
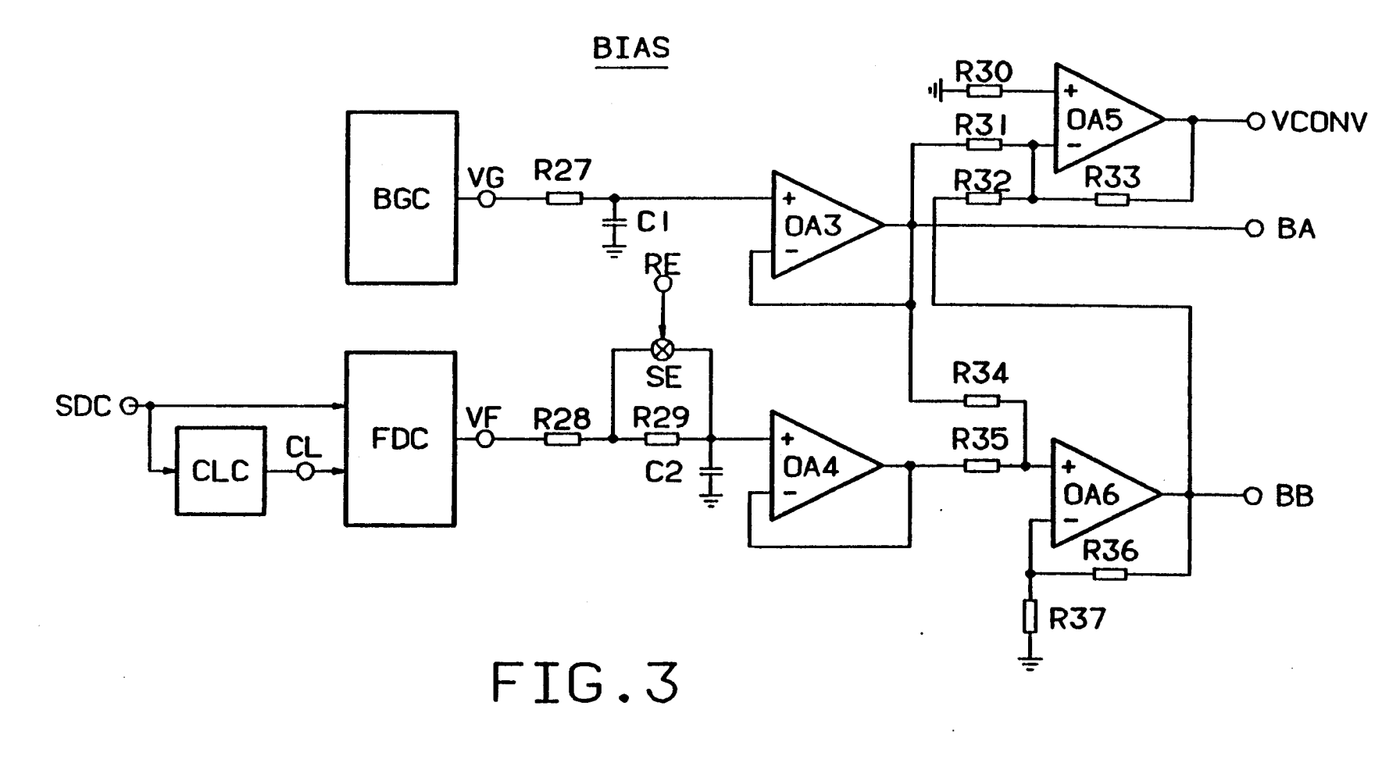
FIG. 3 the DC loop synthesis circuit BIAS of FIG. 1.
Figure 4:
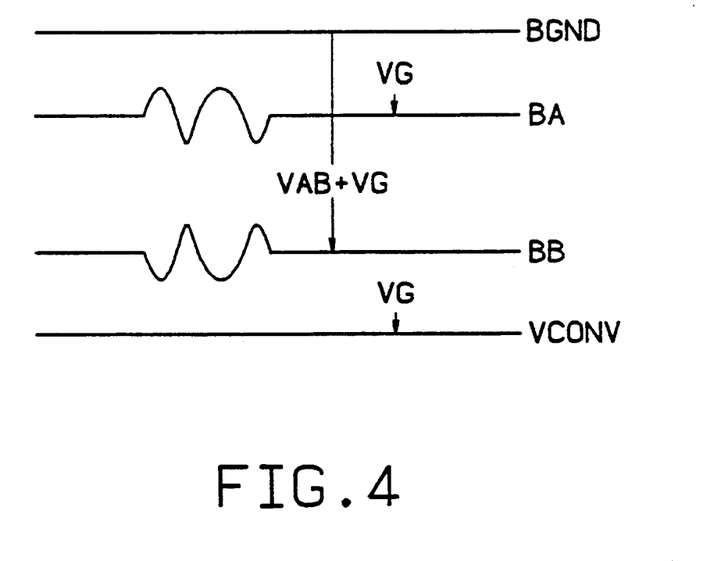
FIG. 4, the relation between the voltages in order to bias the A and B wires of the telecommunication line circuit.

The DC bias voltages on BA and BB, added to the AC biasses at the inputs of LAA and LAB, together with the voltage VCONV are generated by the circuit BIAS represented in more detail in FIG. 3 with the relation between these voltages shown in FIG. 4. Assuming now that pass gates SAA and SBB are unblocked, the bias voltage on BA determines the DC level on AW. This voltage is equal to the ground voltage BGND minus a voltage VG sufficient to prevent the output transistor of LAA from becoming saturated by superimposed AC signals on BA. The voltage VG is generated by a circuit BGC (Bias Generation Circuit).

Figure 5:
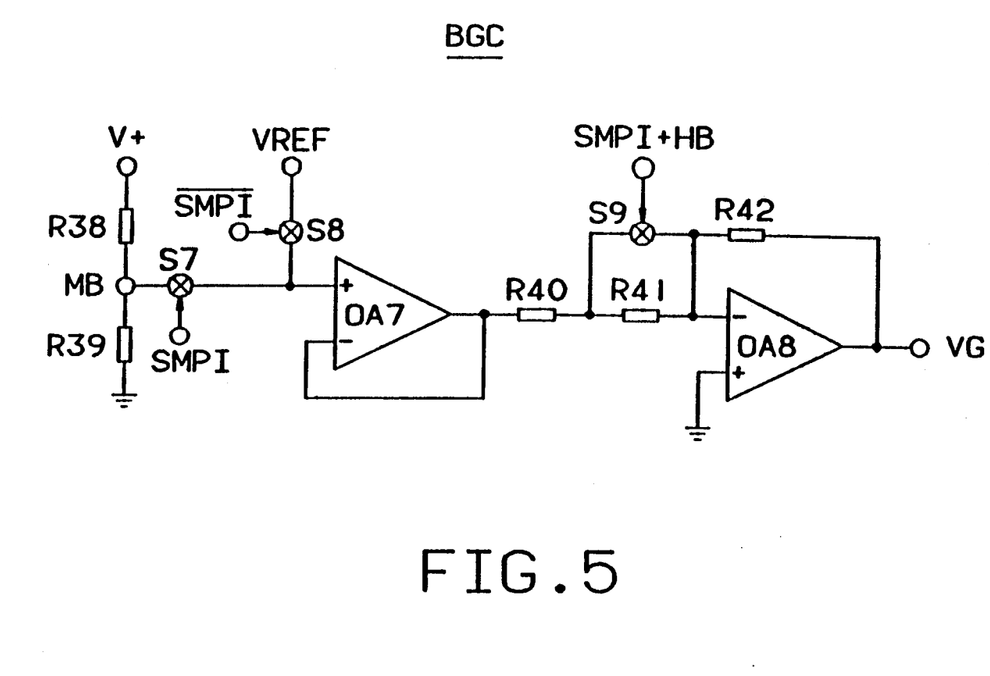
FIG. 5, the bias generation circuit BGC of FIG. 3.

Essentially, BGC, described in more detail later in relation to FIG. 5, is a DC voltage generator, starting from a stable voltage reference (VREF), which is amplified with a gain programmable by control bits (SMPI, HB) from DSP. In this way three levels for the voltage VG are possible: a fixed low-level VG for low level AC signals, a fixed high-level VG for higher level AC signals, and a VG level for the superposition of a metering signal.

As shown in FIG. 3, the output signal VG of BGC is filtered by an RC low pass filter R27-C1 to reduce the noise. The output of this RC circuit is buffered by operational amplifier OA3 with its output BA fed back in conventional fashion to its inverting input.

The bias voltage on BB determines the DC level on BW (SBB unblocked). The voltage on BW has to be such that it results in a DC voltage between AW and BW which is equal to a voltage from a predetermined synthesized feed voltage VFEED in series with two synthesized feed resistances RFEED and in series with a voltage drop produced by a current limiting circuit. Thus, the voltage difference VAB between bias voltage BA and BB can be written as $$VAB = VFEED + (RFEED - 60).2I - VLIM \quad (1)$$

wherein:
VFEED is the DC feed voltage for the telephone line
RFEED is the synthesized feed resistance, from which 60 ohm is subtracted, being the sum of the series feed resistance (R1 or R2) and of the series protecting resistance (R7 or R8) in FIG. 1;
I is the sensed DC line current
VLIM is the voltage drop across a current limiting circuit.

The circuits CLC (Current Limiting Circuit) and FDC (Feed circuit) together synthesize the required voltage of (1) in the general manner shown for instance in the above 1986 article and with CLC being also disclosed for instance in the Belgian patent 898049 and producing at its output CL a voltage corresponding to VLIM. The CLC circuit is programmable by control bits from DSP to four different current limit levels.

The FDC circuit, detailed later in relation to FIG. 6, produces on its output VF a voltage proportional to VFEED, derived from the reference voltage VREF (already mentioned above for BGC detailed in FIG. 5), and added to the voltage drop across the feed resistances RFEED and from which the voltage VLIM on output CL of CLC is subtracted. Voltage VFEED is programmable by a control bit (BV) from DSP to −48 V or −60 V depending on the telephone exchange battery voltage, and the value of RFEED is programmable by a control bit (FR) from DSP and by connection of external resistors or by straps at terminal REXT, to three different fixed resistance levels and one variable resistance level.

The output signal VF (FIG. 3) of FDC is filtered by low pass RC circuit, including series resistors R28-R29 and output shunt capacitor C2, for noise reduction and stabilisation of the DC feedback loop. Resistance R29 is shunted by a pass gate SE controlled by a response time enhancer signal RE in the same way as pass gate PG7 shunts the admittance YA in the copending patent application (E. WILLOCX - E. MOONS - P. GUEBELS 6-7-8). As explained therein the reason for the use of RE is that when it enables the pass gate SE the DC level detection is speeded up by the ensueing shart reduction of the CR time constant. This faster response of the circuit is useful, e.g. for off hook detection. Operational amplifier OA4 buffers the output of the above RC circuit, i.e. direct negative feedback is provided between its output and its inverting input.

The bias voltage on BB is now generated by addition of the voltage on BA to this synthesized voltage VAB of (1). This is done by the summing network R34-R35 which is connected to the non-inverting input of operational amplifier OA6 whose inverting input is connected to its output via negative feedback resistor R36 and via resistor R37 to ground.

As already mentioned, the voltage VCON at the output of the bias circuit BIAS controls a DC/DC converter CONV which generates a voltage VSYN feeding the line amplifier section LA. As shown on FIG. 4, the voltage VCONV is equal to the voltage on BB to which a further biassing voltage VG (available at BA) is added, preventing AC signals from saturating the line amplifiers, to reach VAB+2VG. The addition to secure VCONV is done (FIG. 3) by summing network R31-R32 connected to the inverting input of operational amplifier OA5 and feedback resistor R33. The non-inverting input of OA5 is connected via resistor R30 to ground.

As stressed initially, there is an important difference between prior solutions to generate the above bias and supply voltages for the line driver amplifiers, such as those disclosed in the Belgian patent 898049 and 898051, and the solution described above and illustrated in FIG.

3. In these patents, the feed circuit FDC includes an input from the bias generation circuit BGC and a voltage regulating power transistor connected to the battery terminal BAT to generate the supply voltage VSYN directly. Thereby, instead of the voltage of (1), the output voltage of FDC in the above mentioned patents is $$VSYN = VFEED + (RFEED - 60).2I - V\text{-}LIM + 2VG \quad (2)$$

From this voltage VSYN the voltage on BB is derived by subtraction of VG from VSYN. So the bias voltage of line driver amplifier LAB was referenced to the supply voltage VSYN and not to ground as in the present solution. A first consequence is that the noise component of VSYN is also found on the bias voltage on BB and consequently on the differential voltage across BB and BA. In the solution of the above mentioned patents noise on VSYN comes from imperfect battery noise rejection through the above voltage-regulating power transistor and from a poorer filtering scheme than in the present solution.

A second consequence of referencing the bias voltage BB to VSYN is that changes in the level of VG generated by BGC have a shorter propagation path to output BA (direct path) than to output BB (path via VSYN), leading to audible clicks on the telephone line during the bias level transitions.

The present solution thus reduces noise and clicking on the line amplifier bias voltages by referencing them both to ground and it provides better filtering and nearly equal delay of level transitions for both bias voltages. Also, since the bias voltages of the line amplifiers are independent of the supply voltage VSYN, more ripple and noise can be tolerated on this supply voltage compared to prior solutions, which is important in the case of the use of a DC/DC converter with inherent ripple.

Referring to FIG. 5, the bias generation circuit BGC of FIG. 3 will now be described in more detail. It is controlled by two bits SMPI and HB coming from DSP. These bits determine which amplitude of VG will appear:

| SMPI | HB | VG |
|------|----|----|
| 0 | 0 | low VG for low level voice signals |
| 0 | 1 | high VG for high level voice signals |
| 1 | — | VG for metering signals |

The voltage VG needed in case metering signals are sent on the telephone line is derived from the voltage on the tapping point MB of the voltage divider comprising resistors R38 and R39 between a voltage source V+ and ground. Tapping point MB is coupled to the non-inverting input of operational amplifier OA7 when pass gate S7 is made conductive by bit SMPI at logic level one. Conversely, when SMPI is at logic level zero, pass gate S8 is made conductive, which connects a stable reference voltage on terminal VREF to the input of OA7 used as buffer.

Apart from being fed back to its inverting input, the output voltage of OA7 goes to the inverting input of operational amplifier OA8 through series resistors R40 and R41, output VG of OA8 being fed back to this input through resistor R42 while the non-inverting input is grounded. In case bit SMPI OR HB is at logic one level (SMPI+HB true), pass gate S9 is made conductive which causes R41 to be short-circuited with a consequent gain increase for OA8 thereby allowing for a low and a high level VG for voice signals. Separate SMPI and HB gates could also be used to bypass or insert resistors (not shown) to produce distinct values for VG. Further, such a circuit as R40-R41-R42 and S9 at — input of OA8 can be duplicated between ground and the + input (not shown), instead of a mere ground, so as to achieve balanced input conditions in all cases. If the circuit between ground and the + input is identical in structure and values to R40-R41 and S9, then the resistor corresponding to R42 should additionally ground the + input.

Figure 6:
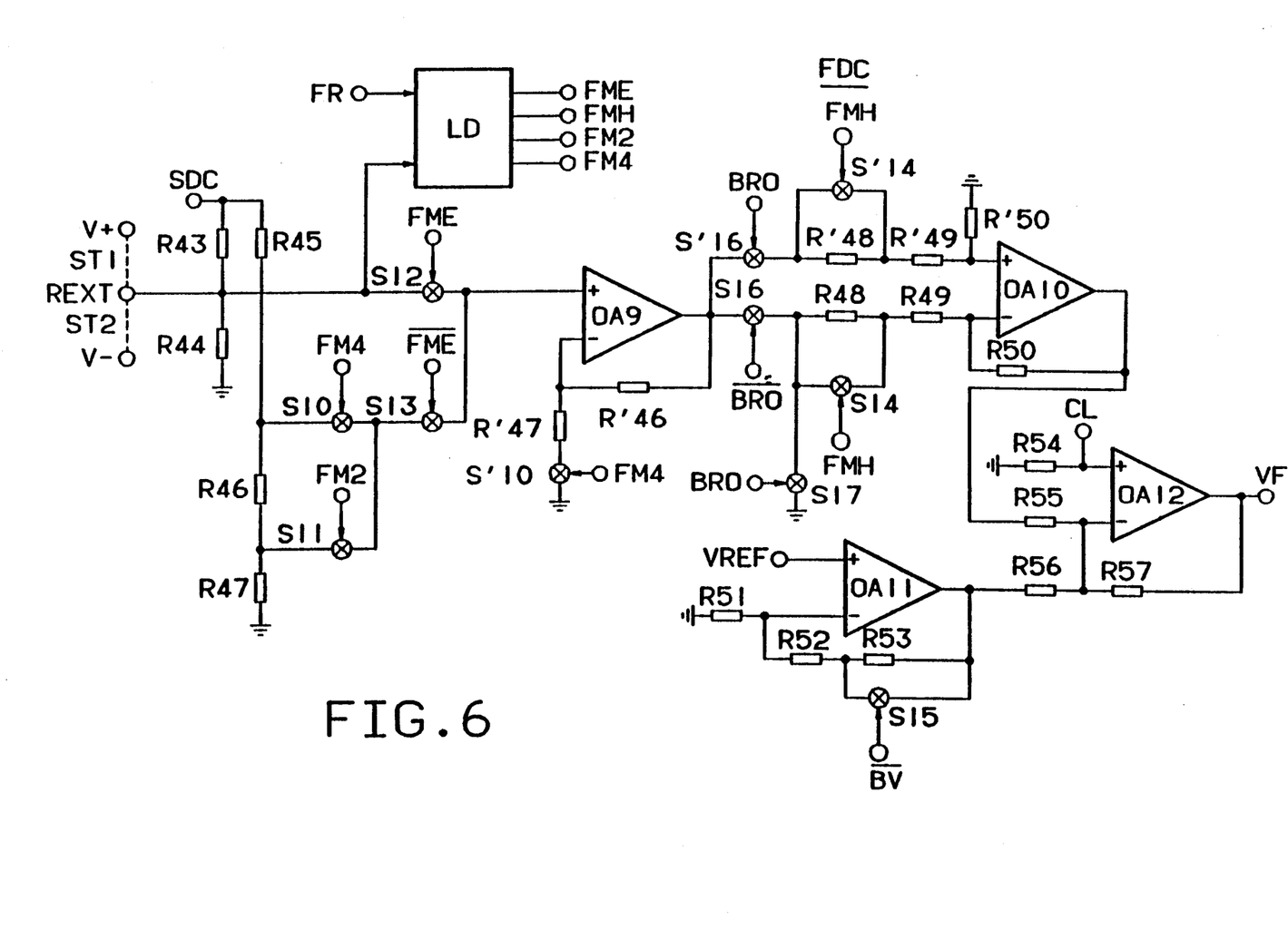
FIG. 6, the feed circuit FDC of FIG 3.

Referring to FIG. 6, the feed circuit FDC will now be described in more detail. This produces at its output VF a voltage equal to VAB given by (1), the third term of which is obtained from voltage VLIM generated at output CL of circuit CLC. The summation of the three terms of (1) is done by operational amplifier OA12.

The CL signal is applied to the non-inverting input of OA12 biassed to ground through resistor R54. The output of operational amplifier 0A11 delivers the VFEED voltage, which is applied to the inverting input of OA12 through series resistor R56. The output of operational amplifier OA10 delivers the voltage (RFEED— 60).2I, applied through series resistor R55 also to the inverting input of OA12 connected to its VF output through negative feedback resistor R57.

The voltage VFEED is obtained by amplification of a stable reference voltage VREF applied to the non-inverting input of operational amplifier 0A11. The inverting input of 0A11 is connected to ground via resistor R51, and to the output of 0A11 through negative feedback resistors R52 and R53 in series. The logic signal $\overline{BV}$, coming from DSP, controls the pass gate S15. When S15 is blocked, the gain of 0A11 is such that its output voltage represents a feed voltage of −60 Volts, and when S15 is conducting, R53 is short-circuited causing the gain of 0A11 to decrease. Its output voltage represents then a feed voltage of −48 Volts.

Input SDC of the feed circuit FDC of FIG. 6 comes from the above mentioned sense circuit SENS (FIG. 1) and presents a voltage proportional to the DC current I in the conductors of the telephone line. This voltage lies between the upper limit V+ and the lower limit V−, these being the supply voltages of the SENS output circuits. The voltage level on SDC is divided by resistors R43 and R44 in series and, in parallel thereto, by resistors R45, R46 and R47 in series. Potentiometer R43-R4 is optionally present outside the chip to provide externally determined low ohmic feed instead of the potentiometer R45-R46-R47, internal to the chip and providing predetermined RFEED values.

The tapping point REXT of divider R43-R44 has a voltage always lower than V+ and higher than V−, except when it is strapped permanently to V+ by strap ST1 or to V− by strap ST2. This voltage on REXT, together with the FR bit coming from DSP, are applied to the level detection circuit LD, which determines the selected RFEED value and has logic outputs FME, FMH, FM2 and FM4, according to the following table:

| FR | REXT | FME | FMH | FM2 | FM4 | RFEED (Ohms) |
|----|------|-----|-----|-----|-----|--------------|
| 0 | — | 0 | 1 | 0 | 1 | 2 × 2000 |
| 1 | V+ | 0 | 0 | 1 | 0 | 2 × 200 |

-continued

| FR | REXT | FME | FMH | FM2 | FM4 | RFEED (Ohms) |
|---|---|---|---|---|---|---|
| 1 | V− | 0 | 0 | 0 | 1 | 2 × 400 |
| 1 | V−<REXT<V+ | 1 | 1 | 0 | 0 | variable |

The above implies that with the same value 1 for FR, LD can not only sense the presence of external potentiometer R43-R44 giving a potential at REXT between V− and V+, and clearly distinct therefrom, but also V+ or V−. Logic outputs FME, FMH, FM2 and FM4 from LD control pass gates S12, S14/S'14, S11 and S10/S'10 respectively, and the inverse of FME controls pass gate S13. Pass gates S12 and S13 alternatively pass the signal from external divider R43-R44 or from divider R45-R46-R47 to the non-inverting input of operational amplifier OA9, with the unblocking of either S10 or S11 enabling to select the potential across R46-R47 or R47 only. The output of OA9 is connected to its inverting input through potentiometer R'46-R'47, the latter grounded only through pass gate S'10, the latter being unblocked simultaneously with S10. Through series resistors R48-R49 or R'48-R'49 respectively, the output of OA9 is coupled to the inverting or to the non-inverting input of operational amplifier OA10 having negative feedback resistor R50 interconnecting its output to its non-inverting input and with its inverting input biassed to ground via resistor R'50. As shown, with BR0 bit from DBP equal to 0, the connection is to the inverting input of OA10 through unblocked pass gate S16 in series with R48-R49 whereas, with BR0 equal to 1, upon AW becoming low instead of BW, this is to the non-inverting input through unblocked pass gate S'16 in series with R'48-R'49, the series combination of R48-R49 being then grounded through unblocked pass gate S17. With resistance values such that R48=R'48, R49=R'49 and moreover R50=R'50=R48+R49, one has a simple absolute value controllable gain amplifier producing the right polarity for BB irrespective of line polarity conditions.

Indeed, if R48-R'48 is short-circuited under the control of the FMH bit unblocking gates S14-S'14, this leads to a higher gain for OA10 delivering an output signal corresponding to the magnitude of (RFEED−60).2I.

It is to be noted that in the above mentioned Belgian patent 898049 the FR bit controls the selection of a high ohmic RFEED or of a low ohmic one, the latter corresponding to speech condition. In the present solution the logical meaning of the FR bit remains the same (high versus low ohmic) and the extension of the number of fixed RFEED values is obtained without the addition of a control bit. In this way the present solution remains software compatible while saving two resistors R43-R44 external to the SLIC integrated circuit in the standard cases of 200 or 400 Ohms low RFEED values.

While the principles of the invention have been described above in connection with specific apparatus, it is to be clearly understood that this description is made only by way of example and not as a limitation on the scope of the invention.

We claim:

1. Telecommunication line circuit including a DC loop resistance synthesizing circuit, said line circuit comprising:
    a Herter bridge,
    two line wires coupled to the Herter bridge,
    two line amplifiers for providing a synthesized feed voltage across the two line wires, a synthesized resistance in each said line wire, and a distinct line potential for each said line wire,
    a sense amplifier coupled to the Herter bridge for producing a sense voltage proportional to a current flowing in the line wires,
    bias means responsive to the sense voltage for providing a distinct respective bias voltage for each of the two line amplifiers,
    battery means for supplying a battery supply voltage, and
    a converter responsive to the bias means for converting the battery supply voltage to a common supply voltage for the two line amplifiers which is a combination of the two respective said distinct bias voltages.

2. Telecommunication line circuit as claimed in claim 1, wherein
    said bias means has a transducer for combining the respective distinct bias voltages, and
    said converter is a switched mode DC/DC converter which is fed by the battery means and is responsive to a DC voltage representative of a DC current through the line wires.

3. Telecommunication line circuit as claimed in claim 1, further comprising at least one push-pull signal source driving the inputs of the two line amplifiers, with four resistances coupling each said source to respective inputs of the two line amplifiers.

4. Telecommunication line circuit as claimed in claim 1, wherein the bias means comprises summing means at its output to add a first said bias potential to said sense voltage to produce a second said bias potential.

5. Telecommunication line circuit as claimed in claim 4, wherein said bias means further comprises an operational amplifier with identical impedance and gating circuits at its inverting and non-inverting inputs for varying the gain of the amplifier while keeping identical impedance input circuits, one connected to the input signal and the other to the reference potential.

6. Telecommunication line circuit as claimed in claim 4, wherein the two bias potentials are added to produce said supply voltage.

7. Telecommunication line circuit as claimed in claim 6, wherein
    said converter is a switched mode DC/DC converter having a transducer fed by the battery means for combining the respective distinct bias voltages,
    said bias means is responsive to a DC voltage representative of a DC current through the line wires,
    each of the two bias potentials are added through two summing inputs of a differential summing amplifier part of a feedback loop associated with the switched mode DC/DC converter and
    the output of the switched mode DC/DC converter as well as a voltage of the order of twice one said bias potentials is added through two further summing inputs having polarities opposite to those of the first two summing inputs.

8. Telecommunication line circuit as claimed in claim 1, wherein said bias means produces a respective output voltage having said respective bias potential with reference to a fixed potential pole of said supply voltage.

9. Telecommunication line circuit as claimed in claim 8 wherein said bias means comprises a low pass filter.

10. Telecommunication line circuit as claimed in claim 9, wherein
said bias means comprises summing means at a first output to add a second bias potential at a second output to said sense voltage so as to produce said first bias potential, and
means are provided to vary the response of said low pass filter including summing means at said first output.

11. Telecommunication line circuit as claimed in claim 1, wherein a set of four controlled gates couple the two bias potentials to the two line amplifiers with only two said gates leading to different said amplifiers being simultaneously unblocked.

12. Telecommunication line circuit as claimed in claim 11, wherein said bias means comprises:
summing means at a first output to add a second said bias potential to said sense voltage so as to produce said first bias potential, and
an absolute value operational amplifier having identical impedance circuits at its inverting and non-inverting inputs and including gating means for inverting the sign of its output signal when the line amplifiers are inversely biassed, and gating means for modifying an absolute gain value, in accordance with the value of said synthesized resistance, by modifying the input impedance circuits.

13. Telecommunication line circuit as claimed in claim 11, further comprising
a power down circuit for bringing the circuit into a power down mode,
a second set of four controlled gates for coupling two low power fixed potentials to the two line amplifiers with only two said of said second set of gates leading to different amplifiers being simultaneously unblocked, and
means operable in said power down mode for biassing said bias potentials to thereby prevent the operation of said first set of four controlled gates.

14. Telecommunication line circuit as claimed in claim 1, wherein said bias means comprises line feed resistance discriminating means having an input fed by a potentiometer connected in the DC loop synthesizing circuit when a non-standard line feed resistance value is desired, the input being alternatively connectable to one out of several selected potentials each of which corresponds to a distinct preset said synthesized resistance.

15. Telecommunication line circuit as claimed in claim 14, wherein the discriminating means has another input for a control bit and means responsive for one value of said control bit for disconnecting the potentiometer from the loop and replacing it by another potentiometer thereby enabling one or more additional synthesized resistances to be selected.

* * * * *